Dec. 1, 1953  B. H. TONGUE  2,661,419
WIDE BAND SPECTRUM ANALYZER
Filed April 18, 1949  3 Sheets-Sheet 1
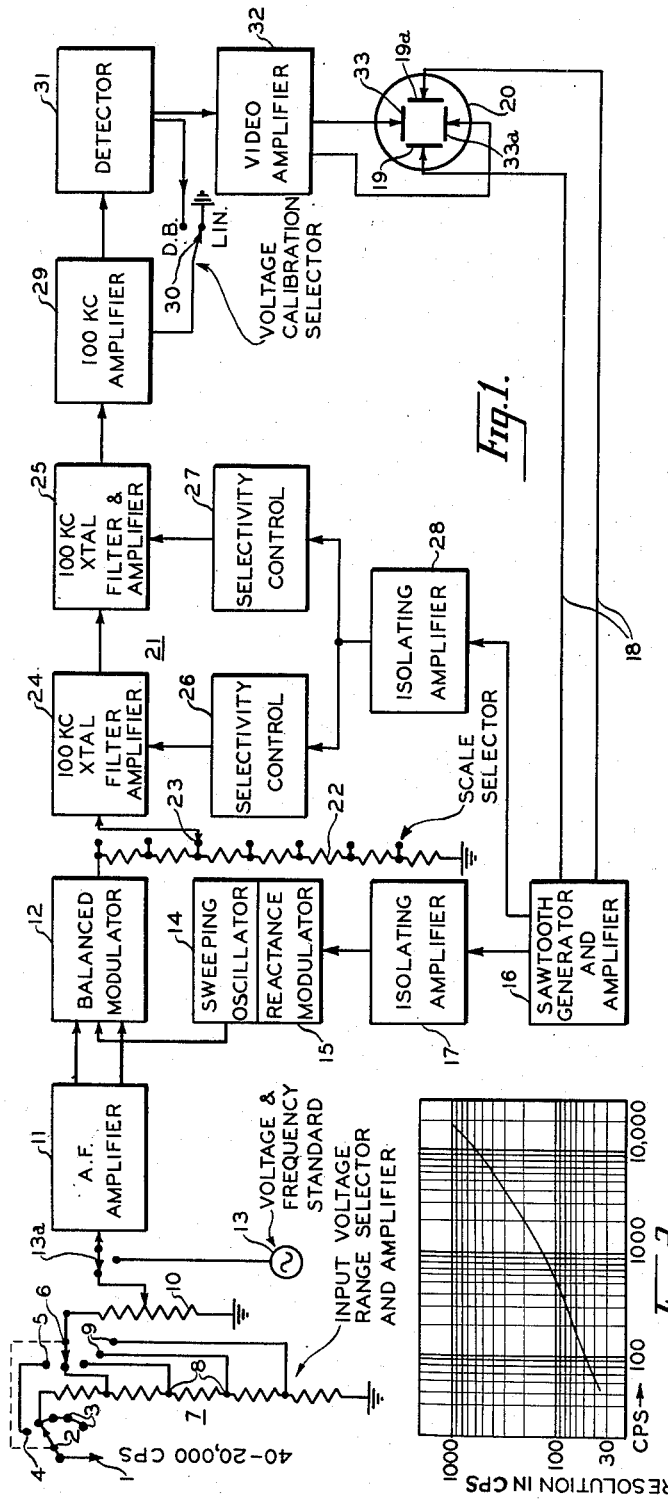
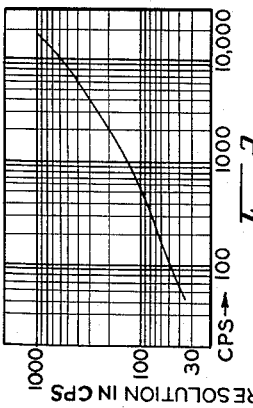
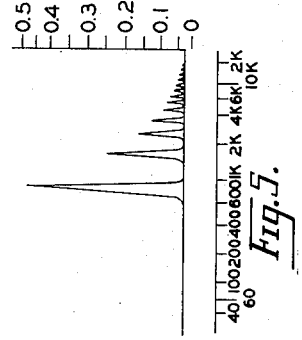
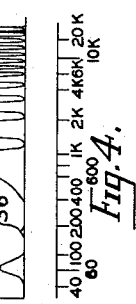
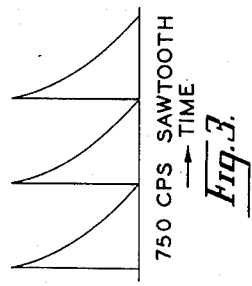
INVENTOR.
BEN H. TONGUE
BY Hyman Hurwitz
ATTORNEY

INVENTOR.
BEN H. TONGUE

Dec. 1, 1953    B. H. TONGUE    2,661,419
WIDE BAND SPECTRUM ANALYZER
Filed April 18, 1949    3 Sheets-Sheet 3

INVENTOR.
BEN H. TONGUE
BY
ATTORNEY

Patented Dec. 1, 1953

2,661,419

UNITED STATES PATENT OFFICE 2,661,419

WIDE BAND SPECTRUM ANALYZER

Ben H. Tongue, Westfield, N. J., assignor, by mesne assignments, to Marcel Wallace, doing business as Panoramic Laboratories, East Port Chester, Conn.

Application April 18, 1949, Serial No. 88,109

16 Claims. (Cl. 250—20)

1

The present invention relates generally to spectrum analyzers of the panoramic type, and more particularly to wide band spectrum analyzers having provision for automatically maintaining optimum resolution of visual display.

The general character of panoramic spectrum analyzers is well known in the art, involving generally an input circuit for translating the spectrum of frequencies to be analyzed, a wide band mixer to the input of which a spectrum of frequencies is applied, a source of local oscillations for application to the mixer to effect heterodyning of the spectrum of frequencies, a narrow band intermediate frequency amplifier coupled to the output of the mixer, which accepts only a relatively small part of the total frequency spectrum to be analyzed, and means for frequency modulating the source of local oscillations to effect translation of successive portions of the frequency spectrum to be analyzed into the intermediate frequency amplifier. The action of the system is then effectively to sweep the frequency spectrum to be analyzed past the narrow band I. F. amplifier, the latter abstracting from the frequency spectrum in succession small increments of signal distributed along the spectrum. The signals present in the I. F. amplifier may be detected and the resulting video signals amplified and applied to modulate or deflect the cathode ray beam of an oscilloscope, a sweep voltage which is functionally related to the frequency of the local oscillator being simultaneously applied to the beam, to provide a frequency base against which signal responsive modulations or deflections may be observed.

Systems of the above character have been described in United States Patent #2,381,940 issued to Marcel Wallace, and patents referred to therein, and in a co-pending application for United States patent, Serial No. #11,265 filed in the name of Marcel Wallace on February 26, 1948, and entitled "Variable Selectivity Panoramic System," now U. S. Patent 2,590,809 on March 25, 1952.

The present invention relates to improvements of systems of the above character, especially when the latter are applied to the analysis of extremely wide band spectra, and involves novel principles of operation, the need for which arises by virtue of the character of transient response inherent in tuned circuits, and consequently the nature of the response of the intermediate frequency amplifier of the conventional type of panoramic spectrum analyzer to signals transiently

2 inserted therein by the frequency modulation or scanning of the source of local oscillations.

It will be clear that any intermediate frequency channel will have a static selectivity characteristic corresponding to a rough approximation with a single circuit resonance curve, and that if the local oscillator of a panoramic spectrum analyzer be swept at a sufficiently slow rate, the visual response of the system to a single impressed frequency at the input of the mixer will correspond precisely with the shape of the static characteristic, regardless of the width of the I. F. channel. As the rate of sweep is increased, however, the response of the system departs from the response which might have been predicted on the basis of the static characteristic, since the intermediate frequency channel does not respond to an impressed signal as rapidly as is necessary to enable the static selectivity characteristic to be followed, and further, since once a response has been established it does not decay as rapidly as the impressed signal which caused the response is removed from the I. F. channel by the sweeping action of the frequency modulated or scanning source of local oscillations. Accordingly, the response is decreased in amplitude and broadened in width.

I define "effective resolution" R of a panoramic spectrum analyzer as the frequency difference in cycles per second between points of the visual response curve of the system at 50% down from from the peak amplitude value, while the system is scanning. Since the effect of scanning at higher speeds is to reduce the response of the I. F. channel to signals impressed thereon, and to broaden the width or the frequency extent of the response, it will be realized that the effect of increasing the speed of scanning is to increase the effective resolution R of the analyzer.

I further define the expression "static resolution" P of a panoramic spectrum analyzer to be the frequency separation in cycles per second between points of the visual response curves of the analyzer which are 50% down from the peak amplitude value taken at zero sweep, or considered practically, at an extremely slow sweep rate, equivalent to point-by-point plot.

It follows that for scanning rates approaching zero, the values of R and P are equal. As the sweep rate is increased, however, the value of R increases, that is, the response of the system to a single frequency signal broadens and becomes greater than P. It has been found, both by analysis and experimentally, that the effective resolution R, under scanning conditions, is approximately equal to $$R = 1.5\sqrt{\frac{df}{dt}}$$

where $$\frac{df}{dt}$$

is the rate of frequency sweep or sweep velocity in cycles per second per second. It follows that the effective resolution of a scanning or panoramic analyzer is proportional to the square root of $$\frac{df}{dt}$$

everything else being equal, so that in a given panoramic analyzer or in an analyzer of any predetermined I. F. band width, an increase of four times in the sweep rate results in increase of resolution by a factor of 2.

The above relations determine a limitation of the value of P for any given value of $$\frac{df}{dt}$$

and vice versa, since a value of P, or static selectivity, must be selected for any given application, which has at least a sufficiently small value to enable adequate resolution, or visual separation of signals, as determined by the operational requirements of the panoramic system, that is, by the total band width to be analyzed and by the required rate of sweep.

It has been found that the optimum value of static resolution which may be employed, i. e. that which provides maximum resolution for any given sweep rate $$\frac{df}{dt}$$

is equal to $$P = 1.5\sqrt{\frac{df}{dt}}$$

Having selected an optimum value for P at any pre-selected sweep rate, the actual resolution obtainable at some other sweep rate is roughly proportional to $$\frac{df}{dt}$$

Since, further, P is the maximum possible resolution it must be selected to provide at least the required resolution, and thereby places a limit on the maximum sweep rate which may be employed.

Study of the above relations indicates that in a panoramic system of spectrum analysis, wherein the total frequency sweep W may extend over a considerable range of values, that is, as great as or greater than 50:1, for example, and where the resolution and accuracy of measurement required at one end of the band may be very considerably different from that required at the other end, and wherein total time consumable in each frequency scan is limited, tremendous improvement in operation may be accomplished by gradually increasing the rate of scan $$\frac{df}{dt}$$

as the high end of the frequency spectrum under analysis is approached, and correspondingly increasing the I. F. static resolution P, or selectivity, in such manner as to maintain continuous optimum scanning resolution R, as determined by the relationships developed above.

For example, in audio spectrum analysis which may be assumed to cover the band of frequencies from 40 to 20,000 cycles per second, the accuracy of frequency measurement at the low end of the band between 40 and 500 cycles is of a different order entirely than the accuracy of measurement and frequency discrimination which may be required, say between 19,000 and 20,000 cycles. In this situation use of a frequency base line of linear character would be unwise, since thereby precisely the same possible frequency discrimination and accuracy of measurement would be provided at both ends of the scale, resulting either in inadequate frequency resolution at the low end of the scale, if a good average rate of scan and I. F. band width were adopted, or an unacceptably long time for the completion of each scan if values suitable for the low end of the spectrum were adopted. Further, the accuracy of measurement and resolution which are required at the low end of the spectrum are useless at the high end, as a practical matter.

For the above reasons a logarithmic frequency presentation is ideal for an audio spectrum analyzer covering the range of frequencies above recited, or any similar range of frequencies, and in fact such a frequency presentation is extremely desirable wherever the highest frequency of spectrum to be analyzed is of the order of 150 or more times the lowest frequency of a spectrum to be analyzed. Since with a logarithmic sweep the rate of sweep, or the sweep velocity, $$\frac{df}{dt}$$

is low at the low frequency and relatively high at the high end of the spectrum being analyzed, a very small I. F. band width must be employed while the lower frequencies are being analyzed, if adequate resolution is to be provided, while conversely at the higher frequencies where the sweep velocity is extremely high, the I. F. band width must be correspondingly increased to avoid loss of resolution and response. To attain the advantage of optimum resolution over the entire band of frequencies being analyzed, the band width of the intermediate frequency amplifier must be automatically varied in step with the frequency being scanned, and must be a function of that frequency such as to satisfy the mathematical relations above indicated, whence the I. F. band width must be narrower when the low frequencies are being scanned and must be broader when the higher frequencies are being scanned.

Assuming then a logarithmic frequency sweep rate, and substituting a logarithmic function in the equations above provided, we may determine by mathematical derivation the manner in which the optimum resolution possible, $R_{opt}$, varies as a function of the instantaneous frequency at which frequency sweep or scan is taking place, as well as with respect to time T required for each sweep, when $f_1$ and $f_2$ represent respectively the frequency limits of the high and low ends of the swept band. The derived equation is:

$$R_{opt} = \frac{2.3}{\sqrt{T}}\sqrt{\log \frac{f_1}{f_2}}\sqrt{f}$$

Accordingly, the required law of the variation of selectivity of the I. F. amplifiers as a function of time may be calculated, and is given by $$S_0 = \frac{.8}{\sqrt{T}} \sqrt{\log \frac{f_1}{f_2} f_1^{\frac{t}{2t_2}}}$$

In the system of the invention crystal tuned I. F. filters are employed, to enable attainment of adequate selectivity in the 40 cycle region of the spectrum under analysis. The selectivity of the filter is varied by inserting a resistance R, in the form of the internal resistance of a vacuum tube, in series with the equivalent series capacity C, inductance L and resistance $R_1$, of the crystal. The selectivity S of the filter, in cycles per second, is then found in terms of $$S = \Delta f = \frac{f_0}{Q_c R_1}(R + R_1)$$

where $Q_c$ is the crystal Q, or figure of merit, and $f_0$ the resonant frequency of the crystal.

Since $Q_c$ and $f_0$ are constants, the equation may be written, $$S = K \frac{R + R_1}{R_1} = K \frac{R}{R_1} + 1$$

substituting this value of S in the equation for maximum resolution.

$$\frac{R}{R_1} = \left[\frac{K_1}{T} \sqrt{\log \frac{f_1}{f_2} f_1^{\frac{t}{2t}}}\right] - 1$$

For any given equipment T, $f_1$ and $f_2$ are normally fixed, whence the equation simplifies to read, $$\frac{R}{R_1} = K_2^{\frac{t}{K_3}} - 1$$

It is found that for sufficiently high crystal Q the required variation of $$\frac{R}{R_1}$$

is relatively small, and may be accomplished by variation of the cathode to ground resistance of a triode. Further, the variation of R being logarithmic with respect to $t$, it is found that the 6J5 tube possesses a suitable law of variation of cathode input resistance vs. grid voltage. Accordingly a linear saw-tooth voltage may be applied to the grid circuit and the requisite law of resistance variation with time produced, at least approximately.

In an actual practical circuit the required values of R may be found to fall outside the logarithmic portion of the triode resistance variation with grid voltage, but in such event the saw-tooth wave may be pre-distorted by an RC filter to cause the values of R to follow closely the ideal curve of variation with time.

It is, accordingly, a primary object of the present invention to provide a novel wide band spectrum analyzer.

It is a further object of the invention to provide a novel wide band spectrum analyzer having optimum resolution over the band.

It is another object of the invention to provide an audio spectrum analyzer, and particularly an audio spectrum analyzer for the band 40–20,000 cycles per second.

It is still another object of the invention to provide a wide band spectrum analyzer capable of analyzing rapidly and repetitively a wide band of frequencies, having a ratio of maximum to minimum frequency of the order of 100 to 1 or greater.

It is still a further object of the invention to provide a wide band spectrum analyzer having a continuously variable rate of frequency scanning.

A further object of the invention resides in the provision of a wide band spectrum analyzer having a logarithmic rate of frequency scan.

Still a further object of the invention resides in the provision of a spectrum analyzer having a continuously variable rate of frequency scan and of intermediate frequency pass band, relatively co-related to provide optimum resolution over the spectrum.

It is an ancillary object of the invention to provide a novel balanced modulator or mixer, which is susceptible of simple adjustment to balanced condition in response to manipulation of a minimum number of controls, the settings of which have substantially no effect one on the other.

The above and still further objects, advantages, and features of the invention will become evident upon consideration of the following detailed description of a specific embodiment thereof, especially when taken in conjunction with the appended drawings, wherein:

Figure 1 is a block diagram of a panoramic spectrum analyzer arranged in accordance with the present invention;

Figure 2 is a plot in logarithmic co-ordinates of the frequency position in the spectrum being analyzed against resolution of the intermediate frequency amplifier of the system in cycles per second;

Figure 3 represents a saw-tooth voltage at 750 cycles per second, representing a typical signal suitable for analysis by apparatus constructed in accordance with the invention;

Figure 6:
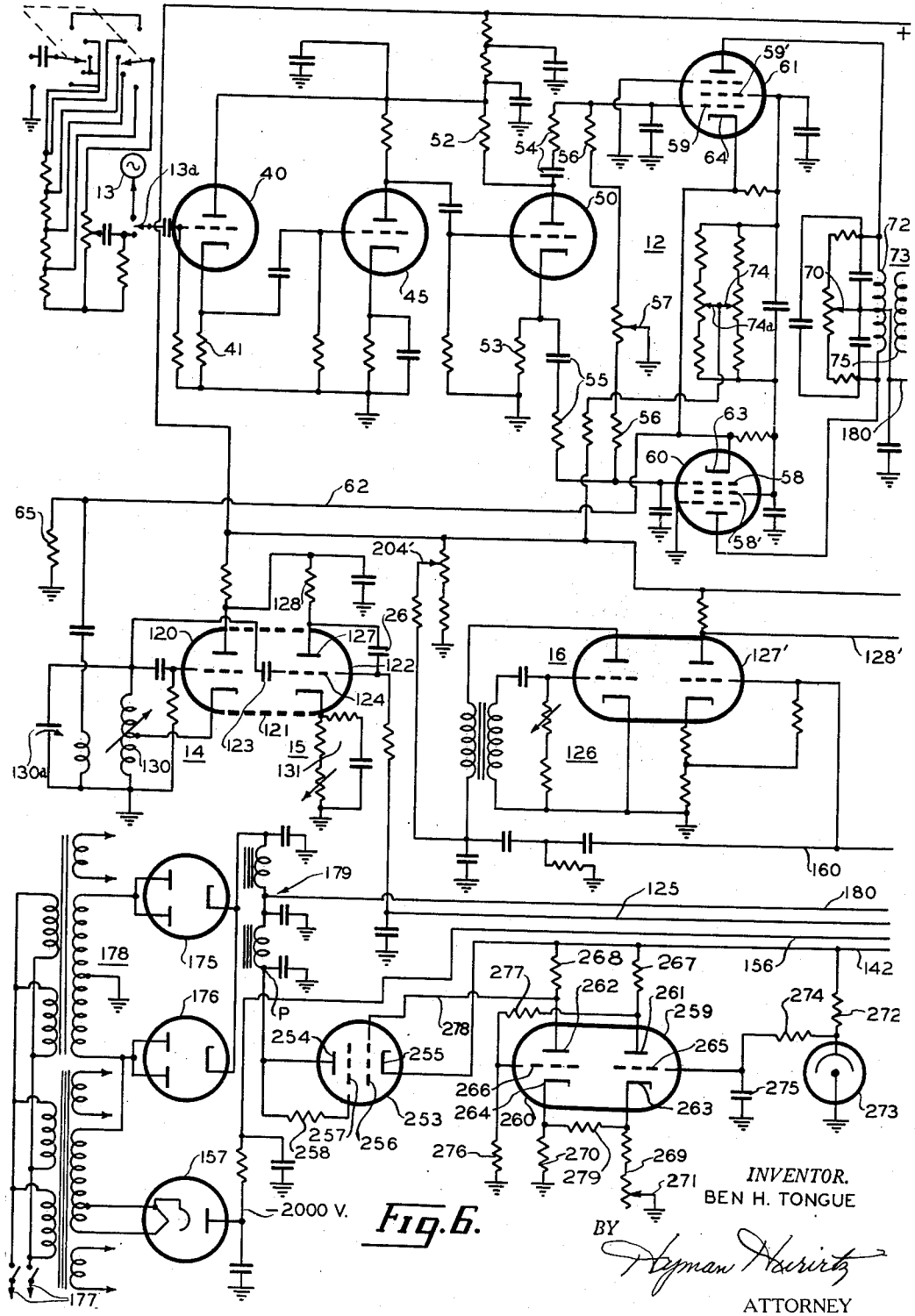
Figure 7:
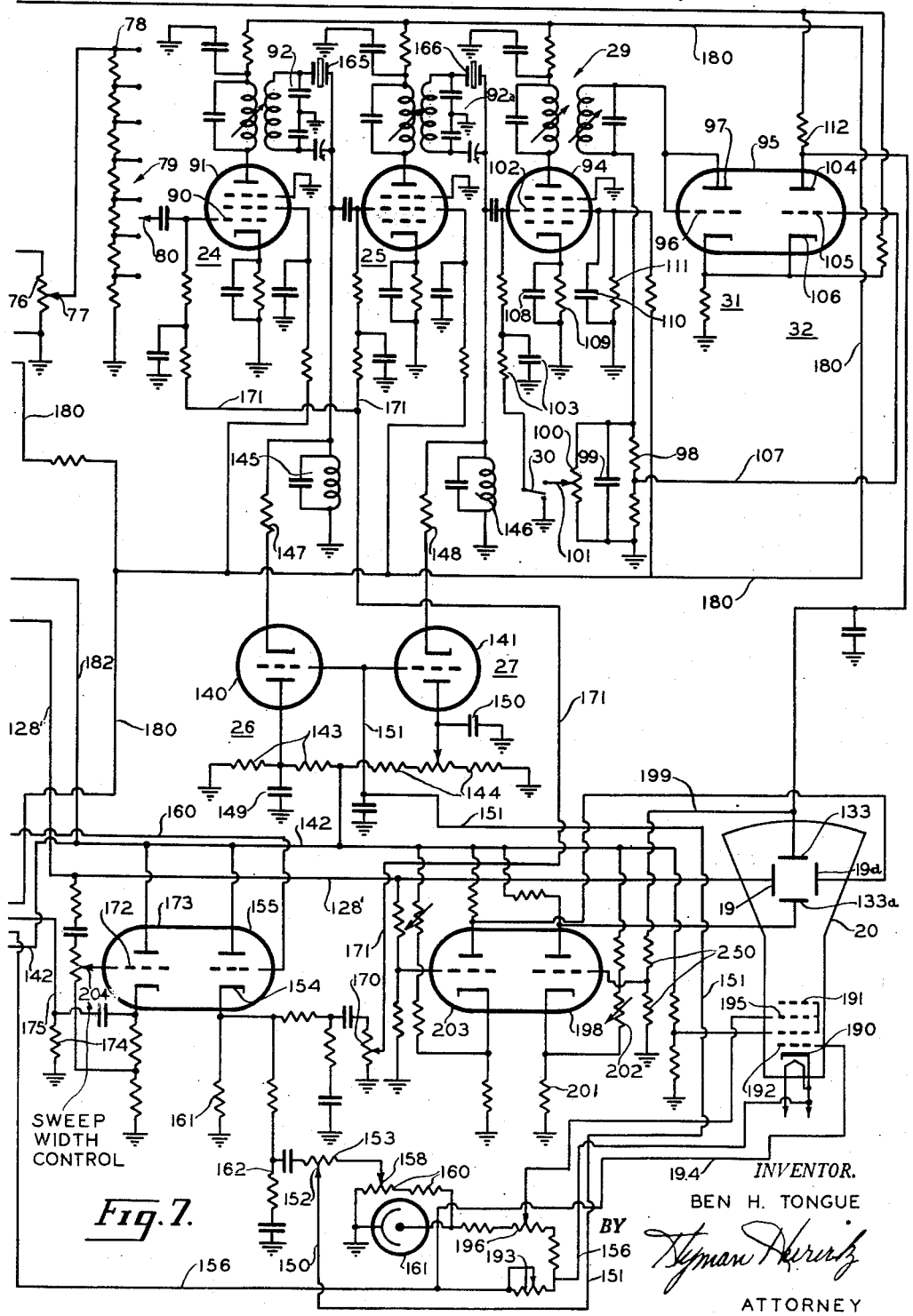

Figure 4 represents a spectrum analysis traced from a photograph of the face of a cathode ray tube controlled in accordance with the present invention, and indicating the character of the frequency content and display provided by the system of the present invention with a saw-tooth voltage in accordance with Figure 3 is impressed thereon, the amplitude scale to which the frequency components are plotted being logarithmic;

Figure 5 corresponds to Figure 4 with linear amplitude scale; and,

Figures 6 and 7 taken together represent a schematic circuit diagram of the embodiment of the invention illustrated in block diagram in Figure 1 of the drawings.

Briefly described, the present invention involves a panoramic spectrum analyzer which is suitable for analyzing extremely wide spectra and particularly for analyzing audio spectra and comprises a source of the spectrum which is to be analyzed connected to the input of a balanced modulator to which is also applied the output of a frequency scanning oscillator, the frequency of which is considerably higher than the highest frequency present in the spectrum subject to analysis. Accordingly, the balanced modulator acts to translate the spectrum to be analyzed into a new spectrum at higher frequencies, while suppressing the frequency of the heterodyning or scanning oscillator. The frequency of the heterodyning oscillator is controlled by a reactance modulator in accordance broadly with conventional practice, the reactance modulator being varied in respect to its reactance in accordance with a voltage supplied by a saw-tooth generator, the output of which is simultaneously applied to the horizontal deflection electrodes of a cathode ray tube indicator. The law of variation of the saw-tooth voltage with time is linear, so that the voltage creates a uniformly generated horizontal trace on the face of the cathode ray tube indicator. The linear voltage variation of the saw-tooth accomplishes a non-linear variation of scanning frequency, so that the spectrum of frequencies to be analyzed is scanned at a logarithmic rate, rapidly at the high end and slowly at the low end. The output of the balanced modulator is applied via a voltage divider which serves as a sensitivity setter, to the input of a two stage crystal filter intermediate frequency amplifier, each stage of which is provided with selectivity control consisting of a vacuum tube acting as a variable resistance, which is subjected to variations of internal impedance in response to a control signal deriving from the saw-tooth generator. By virtue of the selectivity control circuit, the pass band of the crystal controlled intermediate frequency amplifier stages are maintained continuously at such values as to provide optimum resolution of the system for each frequency position within the band being analyzed.

The last selectivity controlled stage of the intermediate frequency amplifier feeds a further I. F. stage, which is not selectivity controlled, but which is operated to provide alternately either a linear or a logarithmic response, whereby the vertical deflection on the face of the cathode ray tube indicator of the system may likewise be either linearly or logarithmically related to the amplitude of the signal frequencies contained in the spectrum being analyzed.

Referring now more specifically to Figure 1 of the drawings, the reference numeral 1 denotes a source of signals which, for the sake of example only may be assumed to extend from 40 to 20,000 cycles per second, it being realized that the principles of the invention may be applied to frequency bands in the audio, sub-audio or supersonic regions or, with minor modifications, to the analysis of extremely wide band spectra in the radio frequencies. The signals applied over the lead 1 are applied by the switch arm 2 to one of the contacts 3, or to the contact 4, of a multicontact selector switch, the contact 4 of which is connected directly with the contact 5 of a further multi-contact selector switch having a selector arm 6. The remaining contacts, 3, are connected to one end of a potentiometer 7 having variable taps, as 8, which are connected to the contacts 9 of the second variable selector switch. The selector arms 2 and 6 are ganged mechanically so that when the arm 2 is in contact with the contact 4 the arm 6 is in contact with the contact 5 and the signals provided over the lead 1 are applied directly to a potentiometer 10, while adjustment of the arm 6 to any of the contacts 9 results in application of the signals provided by the lead 1 to the potentiometer 7, various decimal fractions of the available signal being tapped off in accordance with the setting of the arm 6. The potentiometer 10 then may be used for relatively fine adjustment, or as a gain control for the system, whereas the potentiometer 7 serves as an input voltage range selector.

The voltage available across the potentiometer 10 is applied to the input of an audio frequency amplifier 11, which contains a phase splitter for application to the balanced modulator 12 of push-pull signals corresponding with the spectrum provided on the lead 1.

For purposes of calibrating the present system a standard source of voltage 13 is provided, which may be inserted into the input of the audio frequency amplifier 11 in place of the voltage appearing across the potentiometer 10, by means of a manual two-position switch 13a.

Effectively in balanced relation to the input of the balanced modulator 12 is the output of a frequency sweeping or scanning oscillator 14, which is associated with a reactance tube modulator 15 which serves the purpose of sweeping or scanning the frequency of the oscillator 14 in response to control voltages applied to the reactance modulator 15. Control voltages are applied to the reactance modulator 15 from a saw-tooth generator 16 via an isolating amplifier 17, the voltage waves provided by the saw-tooth generator and amplifier 16 being substantially linear. The output of the amplifier 16 is applied via leads 18 to the horizontal electrodes 19 and 19a of a cathode ray tube indicator 20 of conventional character, and provides a recurrent horizontal trace on the face of the cathode ray tube indicator, which progresses uniformly thereacross with time.

The reactance modulator 15 varies the frequency of the sweeping oscillator 14 non-linearly with time, and specifically in accordance with a law of variation with time such that the difference between the frequency of the sweeping oscillator 14 and the audio frequencies provided by the amplifier 11, when that difference equals the I. F. frequency of the system, specifically 100 kc., varies at a logarithmic rate with time over each scan of the sweep voltage or saw-tooth generator 16.

For each frequency instantaneously assumed by the sweeping oscillator 14 a slightly different portion of the input spectrum of frequencies is converted to a frequency suitable for transfer by the intermediate frequency amplifier 21 of the present system, so that as the frequency of the sweeping oscillator varies with time, successive portions of the spectrum are transferred by the intermediate frequency amplifier. Any specific portion of the spectrum which is instantaneously being translated by the I. F. amplifier 21 corresponds in frequency with an instantaneous value of the voltage output of the saw-tooth generator 16, and accordingly, with an instantaneous position horizontally along the frequency axis of the beam of the cathode ray tube indicator 20. Accordingly, a continual correspondence exists between the frequency within the spectrum of frequencies being analyzed which is instantaneously being subjected to test for the presence of a frequency component, and the horizontal position of the beam of the indicator, and the frequency axis may properly be calibrated logarithmically.

The output of the balanced modulator 12 is applied to the input of the crystal filter intermediate frequency amplifier 21 via a potentiometer 22, having variable taps 23, which is capable of selecting the scale on which the visual presentation may take place, the potentiometer 22 being, for this reason, arranged as a decade scale. Associated with each of the stages 24, 25 of crystal filter intermediate frequency amplifier 21 is a separate selectivity control circuit, the selectivity control circuits being identified by the reference numerals 26 and 27, and each operating to vary the selectivity of one of the crystal filter amplifier stages 24 and 25 over a predetermined range of values such that the band width of the crystal filter amplifier stages 24 and 25 is at a minimum while the low portion of the spectrum subject to analysis is being scanned, and is at a considerably higher value while the high portion of the spectrum subject to analysis is being scanned.

The selectivity control circuits 26 and 27 comprise each a vacuum tube, the internal impedance of which constitutes an element of the crystal filters of the amplifiers 24, 25, and accordingly determines the Q or selectivity thereof. The internal impedance of the vacuum tubes comprised in the selectivity control circuits 26 and 27 is controlled in response to the output of the sawtooth generator and amplifier 16 via a suitable isolating amplifier 28.

It has been shown, supra, that for proper operation of the system in accordance with the mathematical explanation above provided, in order to provide optimum selectivity over the entire range of frequencies being scanned, the time variation of resistance of the selectivity control circuits 26 and 27 must follow a logarithmic law.

This is accomplished by suitable selection and design of the selectivity control circuits 26, 27, as will be pointed out in detail hereinafter.

The output of the last selectivity controlled stage 25 is further amplified in a conventional I. F. stage 29, which is however, operable in two different modes, according as the two position switch 30 is grounded, by connection to the contact marked LIN, for linear, or is connected to the contact marked D. B., which provides rapid A. V. C. voltage from the detector 31, to assure logarithmic response, in a manner which will be described in detail hereinafter.

The output of the detector 31 is amplified in a video amplifier 32, and the output of the latter is then applied to the vertical deflection electrodes 33 and 33a of the cathode ray tube 20 to accomplish vertical deflections proportional to the output of the video amplifier.

Reference is made to Figure 2 of the drawings wherein is provided a plot of resolution of one commercially constructed embodiment of the invention, plotted against audio frequency. The plot indicates how the resolution of the system varies over the spectrum being analyzed, from about 50 cycles at 100 cycles per second, to about 1000 cycles at 20,000 cycles per second, these values being substantially optimum for the instantaneous sweep rates utilized at each position in the audio spectrum.

Figure 3 is a plot against time of a saw-tooth voltage at 750 cycles per second, as it appears on the face of an oscilloscope, Figures 4 and 5 illustrate respectively the appearance of the spectrum as analyzed by the present system, Figure 4 on the logarithmic scale and Figure 5 on the linear scale. Figures 3, 4 and 5 have been traced from actual photographs of the equipment involved. The pips 35 and 36 in Figure 4 represent 60 cycle and 120 cycle components deriving from the power supply which had not been completely balanced out when the photographs were taken.

Referring more particularly to Figures 6 and 7 of the drawings, the reference numeral 40 denotes schematically an audio frequency input amplifier tube, which is cathode coupled via an unby-passed resistor 41 to an anode coupled amplifier stage 45, which is in turn coupled to a phase inverter tube 50 having a resistive plate load 52 and a resistive cathode load 53, which are capacitively coupled via coupling circuits 54 and 55 across a balancing circuit comprising resistors 56 and having an adjustable center tap 57 to ground. The remote ends of the resistors 56 are connected respectively to the control grids 58, 59 of a pair of push-pull connected pentodes 60, 61, driving the pentodes 60, 61 in push-pull relation in response to the audio input signal applied to the triode 40.

Local oscillator voltage is supplied via lead 62 in parallel to the cathodes 63, 64 of pentodes 60 and 61, the local oscillator voltage being developed across resistor 65. It is the function of the balanced modulator comprising pentodes 60 and 61 to heterodyne the spectrum of frequencies being analyzed with the output of the oscillator 14, cancelling the oscillator frequency from the output and leaving ony first order side bands. To this end the mixer is operated at low level and on the square law portion of its characteristic, which is required to assure that spurious modulation products are suppressed by at least 60 db. Further, to assure this result it is essential that the mixer be perfectly balanced, a condition that requires that the product of the mutual conductance and the output impedance of tubes 60 and 61 be equal. This in turn requires that the phase angles of the output circuits be equal, and that the magnitudes of the impedances be inversely proportional to the mutual conductances of the respective tubes.

The phase of the output impedances of the two pentodes 60 and 61 is determined by the setting of the variable tap 70, which varies differentially the total resistance across the respective halves of the primary winding 72 of the output transformer 73.

The mutual conductance of the pentodes 60 and 61 is varied differentially by the manual controls 74 and 74a which serve respectively as coarse and fine adjustments to vary differentially the voltage on the control electrodes 58', 59' of the pentodes 60 and 61 respectively. While the variation of mutual conductance of tubes 60 and 61 results in some variation of plate to cathode resistance, and hence of effective load impedance, the latter effect is relatively slight, in practice, so that adjustment of taps 74 and 74a does not substantially affect phase balance, and adjustment of phase balance by variable tap 70 does not materially affect output impedance balance.

In operation then, adjustment of the variable tap 57 serves to equalize the amount of side band energy in each half of the circuit and thereby to balance out modulation products above the first order. The variable taps 74 and 70 are then adjusted to eliminate the carrier input supplied over lead 62, resulting in transfer to the secondary winding 75 of transformer 73 of first order side bands only of the input carrier.

The secondary winding 75 of transformer 73 is connected across a voltage divider 76, the variable tap 77 of which may be utilized to provide a fine adjustment of the sensitivity of the equipment. The tap 77 is connected to the ungrounded end 78 of a decade voltage divider 79, having a variable tap 80, which serves to provide selectively a plurality of different decimally related scales of reference. So, if the standard voltage introduced by source 13 (Figure 1) effects a predetermined deflection of the beam of the cathode ray tube 20, in response to suitable adjustment of the various sensitivity controls, comparison of the standard voltage with other voltages of different orders of magnitude may be effected by manipulation of the decade arrangement 79.

The variable tap 80 of the decade arrangement 79 feeds the control electrode 90 of pentode 91 of crystal controlled filter amplifier stage 24 (see Figure 1), which has coupled to its anode circuit a conventional crystal filter 92, tuned to a frequency of 100 kc., in a commercial embodiment of the present invention, the filter providing a normal static selectivity of the order of 10 cycles per second, and feeding in cascade a further identical stage 25, which in turn feeds a third I. F. stage 29 comprising a pentode 94, the stage 29 being tuned to the same frequency as the stages 24 and 25, but being relatively wide band and not crystal controlled.

The stage 29 feeds one-half a double triode 95, connected as a diode detector, i. e. with its grid 96 and anode 97 tied together, and comprising a load resistor 98 in series therewith, across which is developed video voltage corresponding in amplitude with the magnitude of the I. F. signal provided by the stage 25, while the switch arm 30 is grounded.

The resistor 98 is bypassed for intermediate frequencies by the condenser 99, and a voltage divider 100 is connected thereacross, which is supplied with a variable tap 101. The variable tap 101 may be connected selectively with the switch arm 30, and when so connected video voltage is supplied to the input or control grid 102 of the pentode 94.

The pentode 94 is operated at low cathode and screen voltage, so that its gain is approximately a logarithmic function of its grid bias. The rectified detector output available across voltage divider 100, and hence at least in part at variable tap 101, and comprising a pulse for each signal component in the input spectrum, is fed back to the control electrode 102 as a rapid A. V. C. bias via the R. C. filter 103, which eliminates unfiltered I. F. signal but does not appreciably attenuate any of the frequency components of the pulses. The pulse A. V. C. voltage has the effect of reducing the gain of the pentode 94 more for large signal than for small signals, and thus compresses the output ratio of the signals in the stage 29.

The video amplifier comprising anode 104, control electrode 105 and cathode 106 of double triode 95 is supplied with only a portion of the total voltage available across resistor 98, the input lead 107 to control electrode 105 being tapped down on the resistor 98, in order to assure that a very high input voltage be necessary to drive the video amplifier to full output. This means that a greater A. V. C. voltage will be developed for a signal causing full scale deflection than would otherwise be the case, and consequently a greater input voltage range can be accommodated.

The time constants of the cathode by-pass condenser 108 and its associated bias resistor 109, of pentode 94, and of screen grid by-pass condenser 110 and voltage dropping resistor 111, must be small compared with the duration of the narrowest visual pip or pulse, which corresponds to the highest input frequency, in order that the A. V. C. operate equally on all pulses, or over the entire input spectrum.

The output of the video amplifier as developed across the plate resistor 112 is applied to a vertical plate 133 of cathode ray tube 20.

The local oscillator 14 of the present system is a conventional Hartley oscillator comprising one-half 120 of the double triode 121, and the tuned circuit 66.

The frequency of the oscillator 14 is controlled by means of a Miller effect reactor 15 comprising the remaining half 122 of the triode 121, the input capacity of the triode half being connected in shunt to the tuned circuit 66 in series with the coupling condenser 123.

The law of time variation of oscillator frequency vs. control voltage is required to be a non-linear function, if the scan is to be logarithmic, but is not itself logarithmic since the difference between the I. F. and the oscillator frequency must be a logarithmic function of time. In the present application the variation of shunt input capacitance is established in response to a gain control voltage impressed on the control electrode 124 of the Miller effect reactor 122 over the lead 125 and consisting of the saw-tooth output voltage generated by the saw-tooth generator 126, and amplified in a manner to be hereinafter described in detail, the output of the saw-tooth generator 126 being further transferred via the cathode coupled stage 127', and via the lead 128' in the anode circuit thereof, to the horizontal deflection electrode 19 of the cathode ray tube 20.

The Miller effect reactor 122 is thus supplied with a voltage of the same wave form as is utilized to establish the frequency base line on the face of the cathode ray tube 19, that is, a linearly varying voltage, and this linearly varying voltage is required to be translated into a non-linear variation of oscillator frequency capable of establishing a logarithmic scan of the spectrum under examination.

The relation of the shunt capacity of the reactor tube 122 to its gain, while the tube is operating class A, a condition which obtains, in a commercial embodiment of the invention, only at the low frequency end of the oscillator sweep, or at the high end of the frequency spectrum under analysis, is given by the equation $$C_2 = \frac{C(1+G)}{1+\left(\frac{R_L r_p}{R_L + r_p}\right)C^2 w^2}$$

where C is the capacity of condenser 26, coupling anode 127 to control electrode 124, $R_L$ is the load resistance 128 of the reactor tube 122, G is the actual gain of the tube 122, $$= \frac{\mu R_L}{R_L + r_p}$$

$r_p$ is the internal resistance of the reactor tube, and $w$ the frequency in radians per second of the oscillator 120, and where $R_L$ is tube load and $r_p$ tube internal resistance, and $\mu$ the gain of the tube, per se.

The low frequency end of the oscillator sweep occurs when $C_2$ is a maximum, or while G is high, and this occurs when $$\frac{1}{wC} = \frac{R_L r_p}{R_L + r_p} \approx r_p$$

The reactance of C should accordingly be made equal to the parallel combination of the load and plate resistance.

The high frequency end of the oscillator sweep is determined almost solely by the inductance 130 and the capacitance 130a of the resonant circuit 66.

The factors which control the time variation of oscillator frequency are

1. The variation of $C_2$ with G, as given by the equation supra.
2. The non-linearity of the reactor tube 122 near cut-off.
3. The time constant of the RC circuit 131 in the cathode circuit of the reactor tube 122.

Considering the equation, supra, the numerator is proportional to gain, G, at high gain, while the denominator, for relatively small frequency swings, remains substantially constant. Therefore, at the low end of the frequency sweep change in frequency is inversely proportional to gain. If we assume that, as a rough approximation, G is proportional to reactor control sawtooth, frequency change at the low end of the oscillator sweep is then roughly inversely proportional to the applied control voltage.

As the saw-tooth goes negative gain G is reduced, the numerator becomes less and less dependent on gain, and the denominator increases. The sweep velocity accordingly progressively decreases as G decreases. The non-linearity of the reactor tube near cut-off (factor 2) accentuates the change of sweep velocity as frequency increases.

The total effect due to factors 1 and 2 is to cause the difference between I. F. and oscillator frequency to approach a logarithmic function at low oscillator frequency, or high input frequency, but to depart from the logarithmic at high oscillator frequency, near reactor tube cut-off, since there the sweep velocity decreases too rapidly.

The time constant circuit 131 speeds up the change of sweep velocity at the high end of the input scan and slows down the sweep deceleration at the low end if suitable selection of the time constant of the cathode circuit 131 is made. At high input frequency, i. e. while the saw-tooth is positive, the resistor of circuit 131 is shunted by the relatively low cathode input resistance of reactor tube 122, and there is some degeneration introduced by circuit 131, which introduces some sweep frequency deceleration. As the saw-tooth approaches its negative maximum the cathode input resistance becomes high and the resistance of circuit 131 is essentially unbypassed, which raises the effective time constant of the cathode circuit of reactor tube 122, reduces cathode degeneration and retards the rapid decay of sweep acceleration.

The overall effect is to obtain a closely logarithmic input spectrum scan with time.

It will be recalled that in the brief exposition of the invention, provided supra, the I. F. stages 24 and 25 were described as subject to selectivity control such as to maintain an optimum value of I. F. static selectivity P for all values of sweep rate of the frequency converting oscillator 120, and that this required attainment of a logarithmic law of resistance variation internally of selectivity controlling vacuum tubes. In accordance with the present embodiment of the invention selectivity control is accomplished in response to variation of internal resistance of triodes 140, and 141, the triode 140 being associated with I. F. stage 24 and triode 141 with I. F. stage 25.

The triodes 140 and 141 are supplied with anode voltage via B+ lead 142, and over voltage dividers 143, 144 respectively, the latter being manually controllable to effect balance or equalization between voltages applied to triodes 140 and 141 respectively. The cathodes of triodes 140 and 141 are connected to ground via tuned circuits 145, 146, resistors 147, 148 are inserted in series with the cathodes of triodes 140, 141, respectively to limit the maximum plate current in the anode circuits of the triodes. Triodes 140 and 141 are accordingly cathode loaded. The anode circuits of triodes 140 and 141 are effectively grounded for I. F. by means of condensers 149 and 150, respectively.

The grids of the triodes 140 and 141 are tied together and to lead 151, the latter being coupled via variable tap 152 to the high resistance voltage divider 153, and the latter being coupled between the cathode 154 of cathode loaded triode 155 and an adjustable negative voltage supplied via lead 156 and deriving from rectifier tube 157.

The variable tap 158 serves to establish an adjustable bias voltage for the triodes 140 and 141, by selecting a portion of the voltage existing across resistors 160, that voltage being regulated by VR tube 161. Accordingly tap 158 serves to establish the quiescent resistance of triodes 140 and 141 and hence the quiescent selectivity of stages 24 and 25.

The triode 155 is driven by saw-tooth signal derived over lead 160 directly from the relaxation oscillator 16, and the output of triode 155 as developed across cathode resistor 161 is transferred via coupling circuit 162 and lead 151 to the control grids of triodes 140 and 141, to vary the internal resistance thereof. Varying this internal resistance effectively varies the cathode to ground resistances of triodes 140 and 141, which effectively comprise the effective resistances of tuned circuits 145 and 146, as seen by the filter circuits 92 and 92a. Since these resistances may be considered effectively in series with the resistance of the crystals 165, 166 of the filters 92 and 92a, respectively, the pass band of the latter may be varied by varying the control voltage applied to triodes 140 and 141.

As has been indicated, supra, the cathode to ground impedance of triodes 140 and 141 may be shown to be logarithmic over a considerable portion of the grid voltage range, so that, for linear saw-tooth control voltage the required logarithmic variation of triode resistance required to provide the desired law of variation of I. F. selectivity with time is established. To the extent that the required logarithmic law is not followed in practice over the entire range of control voltages, some compensating distortion may be introduced by the coupling circuit 162.

As the selectivity of the I. F. stages 24 and 25 is varied the gain of these stages is likewise varied. This is an undesirable effect, since the system of the invention is desired to provide accurate measurements of amplitude of the various frequency components presented.

The variation in gain due to variation in selectivity may be compensated by a variation in tube gain, and to this end a control voltage deriving from cathode load 161 of triode 155 is applied via coupling circuit 170 and lead 171 jointly to the control electrodes of the I. F. amplifier tubes of stages 24 and 25 and serve to vary the gain thereof such as to flatten out the gain variation with variation of selectivity.

The saw-tooth output of the amplifier tube 127' is applied via lead 128' to the control electrode 172 of amplifier 173 the output of which is cathode coupled via coupling circuit 174 and lead 125 to the control electrode of reactor tube 122.

The B+ supply for the system is of conventional character, comprising push-pull diodes 175 and 176, which rectify this A. C. supply provided via leads 177 and power transformer 178. The rectified voltage is filtered by chokes and condensers collectively identified by the reference numeral 179 and applied via lead 180 for distribution to the screens and anodes of th I. F.

amplifier stages 24, 25, of pentode 94, and the anodes of the balanced mixer comprising pentodes 60 and 61.

Positive anode voltage is further supplied over lead 142 to the anodes of tubes 155 and 173, and via lead 182 to triode 127, the screens of pentodes 60 and 61, the anodes of the oscillator 120 and the reactor 122, and the anodes of triodes 40, 45 and 50.

The power supply system further comprises a voltage regulator of novel character, per se, which is adjustable to provide zero, positive or negative regulation for load changes or for input variations, or both.

The regulator comprises a vacuum tube 253, having an anode 254, a cathode 255, a first control grid 256, and a second control grid 257. The anode 254 is connected to the output terminal P of the power filter 179, and the cathode to line 142, the vacuum tube 253 being thus connected in series between the line 142 and the power filter 179. The internal resistance of the vacuum tube 253, which is determined by the potential of control grid 256, constitutes a variable resistance in series with the internal impedance of the power supply for the regulator. The control grid 256 is connected to the output circuit of a two stage direct coupled amplifier consisting of a double triode having sections 259, 260, and associated elements.

The triode sections 259, 260, connected in cascade, have, respectively, anodes 261, 262, cathodes 263, 264, and control grids 265, 266. The anodes 261, 262, of the triode sections 259, 260, are connected through plate load resistors 267, 268, respectively, to the line 142. The cathodes 263, 264 are connected to ground through cathode biasing resistors 269, 270, respectively, which are unbypassed. The cathode biasing resistor 269 for the first triode section 259 is provided with a grounded variable tap 271, to vary the bias applied to the first triode section. Resistor 272 is connected in series with a gas regulator tube 273 between the line 142 and ground. The junction of the resistor 272 and the gas regulator tube 273, is connected through a smoothing resistor 274 to the control grid 265 of the triode section 261, and a smoothing condenser 275 is connected across the smoothing resistor 274 and the gas regulator 272 taken in series. The resistor 274 and the smoothing condenser 275 are provided to remove any short time fluctuation from the control grid 265, due to output changes of the gas regulator. The latter serves to maintain the potential of the control grid 265 at a fixed value. The control grid 266, of the triode section 260, is biased through grid biasing resistor, 276, and a coupling resistor 277, which, together, subject the control grid 266 to a predetermined fraction of the variations in plate voltage of triode section 259. The anode 262 of triode section 260 is connected via lead 278 to the control grid 256 of the vacuum tube 253 and subjects the grid to the variations in plate voltage of triode section 260. A regenerative feed-back path is provided for the two stage amplifier by connecting the cathode 263 of the triode section 259 through a variable feed-back resistor 279 to the cathode 264 of the triode section 260. The gain of the direct coupled amplifier consisting of double triodes 259, 260, and associated elements may be made to increase, pass through infinity, and go negative by varying the magnitude of the feed-back resistor 279 in a decreasing sense.

The operation of the regulated voltage supply, with the gain of the direct coupled amplifier increased by degeneration, will now be described. Assuming that the voltage on line 142 increases because of an increase in the input voltage or a decrease in the load, the plate potential of the triode section 259, increases and the control grid 266 of triode section 260 will become more positive. An increase in the control grid potential causes a greater current flow in triode section 260 and a corresponding increase in the cathode potential and decrease in the anode potential thereof. The voltage on the control grid 256 of vacuum tube 253 decreases as the anode potential of triode section 260 decreases, and causes a corresponding increase in the plate resistance of the vacuum tube 253 which will compensate the tendency for increased output voltage. As the anode potential of the triode section 260 decreases with increase of tube current, the potential of the cathode 264 goes more positive. The cathode of triode section 259 which is directly coupled through the feed-back resistor 15, to the cathode 264, goes more positive.

When the cathode 263 goes more positive, the potential of grid 265 being fixed, the difference in potential between grid 265 and cathode 263 is decreased, resulting in an increase in anode potential. This increase is reflected at the tube 253 as a further decrease in control grid potential, which increases the internal resistance of tube 253 still further. The effect is thus cumulative, and the regulation extremely effective.

The total gain of the amplifier comprising triode sections 259 and 260 may be made positive, in accordance with the preceding description. However, the gain is controllable to be negative, by proper selection of values of resistor 279, and may be made to assume any value from infinity, through finite positive values, to finite negative values. If the value of resistor 279 is so selected, in relation to the remaining circuit parameters, that gain is infinite, without, nevertheless, causing oscillations, regulation is zero, i. e. changes in input voltage or output current have no effect on output voltage. If the gain is made positive, but not infinite, regulation is accomplished, but is not perfect. If, however, the gain of the amplifier comprising triode sections 269 and 270 is made negative by suitable reduction in value of resistor 279, regulation is similarly negative.

I have accordingly provided an essentially simple and economical voltage regulator, having a wide range of modes of operation, in response to a simple control, i. e. variation of a coupling resistor.

The cathode ray tube 20 is provided with a cathode 190, which is connected to lead 156, and hence to voltage of negative polarity as provided by rectifier tube 157, the cathode ray tube operating, then with its anode 191 near ground potential. The intensity control electrode 192 is separated adjustably in potential from the cathode 190 by the resistance existing across potentiometer 193, to one end of which it is connected by lead 194. The focus grid 195 is then adjustably tapped between lead 196 and ground on voltage divider 196.

It will be recalled that deflection electrode 13 of cathode ray tube 20 is connected directly to the anode of tube 127 via lead 128, and that deflection electrode 133 is connected directly to anode 104 of double triode 98. To provide push-pull deflection of the beam of the cathode ray tube indicator 20 the remaining vertical plate 133a is connected to the anode of plate loaded triode 198, which is driven via lead 199 and voltage divider 200 from the same potential as is electrode 133, and serves as a phase reversal tube. The cathode of triode 198 is self biassed via resistor 201, and bias voltage is adjustably added across resistor 21 from line 142 via adjustable resistor 202 to provide vertical spot positioning.

Similarly, triode 203 is utilized to drive deflection electrode 19a and for horizontal beam positioning.

Total horizontal deflection is controlled by the setting of tap 204, which serves to set the amplitude of the control voltage applied to reactor 122. Tap 204 serves to set the amplitude of the control saw-tooth applied to reactor 122, whereby the scanning width is controlled.

Briefly describing now the operation of the present system, in analyzing a band of frequencies, which may occupy the spectrum 40-20,000 cycles per second, in a specific embodiment of my invention, we assume an input consisting of the saw-tooth voltage of Figure 3 of the drawings, repetitive at 750 C. P. S. A desired decimal fraction of the input amplitude is selected by manipulation of switch arms 2, 6, to provide a desired scale of visual presentation, after adjustment of the sensitivity of the apparatus by connecting standard source 13 in circuit, and adjusting voltage divider 10 and sensitivity control tap 77 to provide standard deflection at the proper frequency scale position, and adjusting vertical and horizontal spot position and total horizontal deflection to correspond with the extent of the frequency scale by controlling the position of tap 204'. The input to the audio frequency amplifier 11, comprising triodes 40, 45 and phase splitter tube 50, is applied to balanced modulator 12, which is assumed to have been previously balanced by adjustment of variable taps 74, 74a, and 70.

The output of the oscillator 120 is applied in parallel to the cathodes of the pentodes 60, 61 of the balanced modulator 12, the frequency of the oscillator 120 being varied in response to saw-tooth control voltage applied to Miller reactor 122 by saw-tooth generator 126 and saw-tooth amplifier 127. The output of the balanced modulator consists of the first order side bands of the local oscillator 14, the carrier being eliminated, and the upper side band is selected by the I. F. filters 24 and 25, amplified by selectivity controlled filters and amplifiers 24, 25 and by amplifier 29, detected by detector 31, the detected output amplified by video amplifier 32, and the amplified voltage fed to the vertical plates of cathode ray tube 20 for visual presentation.

Since the upper side band of the mixer output is selected by the I. F. amplifiers the local oscillator frequency is lower than the I. F. frequency, 100 kc. in one specific embodiment of the invention. The saw-tooth voltage is arranged to progress negatively with time, and to sweep the local oscillator frequency from lower to higher values progressively, this serving to scan the input spectrum from higher to lower values, progressively.

The saw-tooth voltage provided by saw-tooth generator 16 is applied, after amplification, to provide a linear horizontal deflection on the face of the indicator 20. The variation of oscillator frequency with time is arranged to be non-linear, and such as to provide a logarithmic scan of the input spectrum, slowly at the low end and rapidly at the high end.

The frequency base line on the face of cathode ray tube indicator 20, accordingly, is logarithmically calibrated.

The optimum value of static resolution of the I. F. amplifiers 24, 25, 29, in cascade, is determined by the rate of sweep or scan of the spectrum presented thereto, and therefore, a smaller I. F. band width may be employed at the low end of the spectrum, providing better visual resolution in cycles per second. Conversely, at high frequencies, the sweep or scan velocity is higher, with a logarithmic sweep, and the I. F. band width must be increased to avoid loss of response or transient ringing.

To obtain the advantage of increased resolution at the low frequencies the I. F. band width is automatically varied in step with the frequency being scanned, in response to selectivity control circuits 26, 27, which are driven by the saw-tooth voltage provided by saw-tooth generator and amplifier 16.

The variation of selectivity is proportioned to provide optimum visual resolution over the band, in accordance with principles explained supra.

While I have described one specific preferred embodiment of my invention, it will be realized that variations and re-arrangements of the specific system described and illustrated as a preferred embodiment may be resorted to without departing from the true spirit and scope of the invention as defined in the appended claims.

What I claim and desire to secure by Letters Patent of the United States is:

1. In combination, a source of a spectrum of frequencies, a tuned filter, means for converting successive increments of said spectrum of frequencies to the frequency of said filter in time succession, and means for visually presenting the frequency content of said frequency spectrum in response to signals derived from said tuned filter, said means for converting comprising an oscillator and means for continuously tuning said oscillator over a predetermined band in accordance with a substantially non-linear law of frequency variation with time, the frequency variation with time varying in accordance with the difference between the frequency of said filter and a particular frequency in said spectrum of frequencies which is being converted, greater frequency variations with time occurring during conversion of increasingly higher frequency portions of said spectrum, selectivity control means for said tunable filter, and means for controlling said selectivity control means so as to provide substantially optimum selectivity of said tuned filter for each instantaneous rate of frequency variation with time.

2. In combination, a source of a spectrum of frequencies, a tuned filter, means for sweeping successive increments of said spectrum of frequencies past the frequency of said filter in time succession, and means for visually presenting the frequency content of said frequency spectrum in response to signals derived from said tuned filter, said means for sweeping comprising an oscillator and means for continuously tuning said oscillator in accordance with a substantially logarithmic law of frequency variation with time, the frequency variation with time of said oscillator varying in accordance with the difference between the frequency of said filter and a particular frequency in said spectrum of frequencies, with greater rates of frequency variation occurring while sweeping the higher frequency portions of said spectrum of frequencies, selectivity control means for said tunable filter, and means for controlling said selectivity control means so as to provide substantially optimum selectivity of said tuned filter for each instantaneous rate of frequency variation with time during each sweep of said spectrum.

3. An audio spectrum analyzer, comprising a source of a spectrum of audio frequencies, means for converting said audio frequencies to a higher frequency, said last means comprising a balanced mixer and a tunable local oscillator, a source of substantially linear saw-tooth voltage, means responsive to said voltage for varying the frequency of said local oscillator to convert the frequencies of said spectrum of audio frequencies in succession to said higher frequency, at a rate such that the rate of change of converted frequency at the intermediate frequency varies with time substantially logarithmically, said rate of change being higher for the higher frequencies of said audio spectrum.

4. The system of panoramic spectrum analysis for spectra of width "W" cycles and having a ratio of maximum to minimum frequency of at least 10:1 including, automatic frequency scanning means, said means periodically scanning a band of the spectrum of width "W" cycles per second at a rate of $$\frac{df}{dt}$$

cycles per second per second, where $$\frac{df}{dt}$$

has a different value at each point of said spectrum, in accordance with the value of the frequency of said spectrum which is instantaneously being scanned, filer means following said scanning means and having a static resolution of P cycles per second, means for continuously varying the value of P as $$\frac{df}{dt}$$

varies so that the resolution of said system remains between $$.2\sqrt{\frac{df}{dt}} \text{ and } 5\sqrt{\frac{df}{dt}}$$

5. The system of panoramic spectrum analysis for spectra of width "W" cycles, having a ratio of maximum to minimum frequency of at least 10:1, including, automatic repetitive frequency scanning means, said means periodically covering said spectrum at a rate $$\frac{df}{dt}$$

cycles per second per second, where $$\frac{df}{dt}$$

varies logarithmically with time during each scan of said scanning means, in accordance with the value of the frequency of said spectrum which is instantaneously being scanned, filter means following said scanning means and having a variable static resolution of P cycles per second, and means for continuously varying said static resolution P as $$\frac{df}{dt}$$

varies so that the resolution of said system remains between $$.2\sqrt{\frac{df}{dt}} \text{ and } 5\sqrt{\frac{df}{dt}}$$

6. The system of panoramic spectrum analysis for a spectrum of width "W" cycles, having a ratio of maximum to minimum frequency of at least 10:1, including, means for converting said spectrum to higher frequencies, said last means comprising a frequency scanning oscillator scanning a band of frequencies of width "W" cycles, a source of control voltage having an amplitude variable with time, means responsive to said control voltage for varying the frequency of said local oscillator to convert the frequencies of said spectrum in succession to a predetermined frequency, at a rate such that the rate of change $$\frac{df}{dt}$$

in cycles per second per second of converted frequency at the predetermined frequency varies continuously with time during each scan, the value of $$\frac{df}{dt}$$

varying in accordance with the difference between the converted frequency and the particular frequency in said spectrum which is being converted, an amplifier of variable selectivity tuned to said predetermined frequency for amplifying said predetermined frequency, and means for continuously varying the selectivity of said amplifier to maintain said selectivity between values of $$.2\sqrt{\frac{df}{dt}} \text{ and } 5\sqrt{\frac{df}{dt}}$$

cycles per second.

7. A system of wide band spectrum analysis, comprising, a frequency converting mixer, a tunable oscillator, means for applying said spectrum to said mixer, means for connecting said oscillator to said mixer, said spectrum comprising frequencies between values of $f_1$ and $f_2$ cycles per second, $f_2$ being the higher value, said oscillator providing a frequency variable between $f_3$ and $f_4$ cycles per second, $f_3$ greater than $f_2$ and $f_4$ greater than $f_3$, means for continuously varying said frequency of said oscillator between $f_3$ and $f_4$ cycles per second in accordance with a nonlinear law of variation of frequency with time, the frequency variation with time varying in accordance with the difference between the converted frequency and a particular frequency in said spectrum, a tuned filter having variable static resolution P, means for connecting said mixer to said tuned filter for selection of converted output signals deriving from said mixer, and means for continuously varying the value of P so as to maintain the dynamic resolution of said system substantially at optimum value during said variation of frequency with time.

8. A frequency scanning wide band spectrum analyzer, comprising a frequency converter, said frequency converter comprising a mixer and a frequency scanning oscillator, a narrow band intermediate frequency amplifier for amplifying output signals derivable from said frequency converter in succession in response to frequency scanning of said frequency scanning oscillator, reactor means for varying the frequency of said oscillator periodically, a source of periodically linearly varying voltage operating in synchronism with said reactor means, said reactor means constructed and arranged to provide a non-linear rate of variation of output frequency of said frequency scanning oscillator in response to said linearly varying voltage which is adapted to provide a logarithmic rate of frequency scan of said wide band spectrum, the frequency variation with time of the scanning oscillator frequency varying in accordance with the difference between the frequency of said intermediate frequency amplifier and a particular frequency in said spectrum of frequencies.

9. The combination in accordance with claim 8, wherein is further provided, a visual indicator having means for generating a visual indication, and deflecting means for deflecting said indication in two coordinate directions, means responsive to said periodically linearly varying voltage for actuating said deflecting means to deflect said indication at a linear rate of motion in one of said coordinate directions, and means responsive to the signal output of said narrow band intermediate frequency amplifier for actuating said deflecting means to deflect said indication in the other of said coordinate directions.

10. In a wide band superheterodyne receiver for receiving a wide band frequency spectrum, a local oscillator and a narrow band intermediate frequency amplifier, means for varying the frequency of said local oscillator at a continuously varying rate, the frequency variation with time of the local oscillator frequency varying in accordance with the difference between the frequency of said intermediate frequency amplifier and a particular frequency in said spectrum, at each instant of time, and means for continuously varying the selectivity of said intermediate frequency amplifier in proportion to the square root of the rate of variation of frequency of said local oscillator at each instant of time during the latter variation.

11. A spectrum analyzer comprising frequency scanning means, said means scanning a band of the spectrum having a width of "W" cycles per second and an instantaneous rate of scan of $$\frac{df}{dt}$$

cycles per second, where $$\frac{df}{dt}$$

is continuously varying during a scan of said band of the spectrum, and has a value in accordance with the frequency instantaneously being scanned, frequency selective means following the said scanning means and having a static resolution of $p$ cycles per second, $p$ being variable, and means for maintaining the value of $p$ greater than $$.2\sqrt{\frac{df}{dt}}$$

for all values of $$\frac{df}{dt}$$

during said scan of said band of the spectrum.

12. A spectrum analyzer, comprising, means for receiving signals in a band of the spectrum having a width of $p$ cycles per second, means for displacing said band at a rate of $$\frac{df}{dt}$$

cycles per second per second across said spectrum, where $$\frac{df}{dt}$$

assumes a plurality of substantially different values during each said displacement, and higher values while higher frequency portions of said spectrum are scanned, the value of $$\frac{df}{dt}$$

varying in accordance with the mean frequency of said band, means for maintaining the value of $p$ between $$.2\sqrt{\frac{df}{dt}} \text{ and } 5\sqrt{\frac{df}{dt}}$$

for all values $$\frac{df}{dt}$$

assumes during said displacement, means for converting each signal into a visual sign, and means for spacing each pair of said visual signs in accordance with the difference of frequency between the corresponding signals.

13. The combination in accordance with claim 12 wherein said means for receiving signals and having a width of $p$ cycles per second is an intermediate frequency amplifier.

14. The combination in accordance with claim 12 wherein said means for converting each signal into a visual sign comprises a cathode ray tube indicator having a display surface, and means for generating an electron beam and directing said beam against said display surface, and wherein said means for spacing each pair of said visual signs comprises means for deflecting said beam linearly with time across said display surface.

15. The combination in accordance with claim 12 wherein said rate $$\frac{df}{dt}$$

varies logarithmically.

16. In combination, a source of a spectrum of frequencies, a tuned filter, means for converting successive increments of said spectrum of frequencies to the frequency of said filter in time succession, and means for visually presenting the frequency content of said frequency spectrum in response to signals derived from said tuned filter, said means for converting comprising an oscillator and means for continuously tuning said oscillator over a predetermined band in accordance with a substantially non-linear law of frequency variation with time, the frequency variation with time being logarithmically proportional to the difference between the frequency of said filter and the particular frequency in said spectrum of frequencies which is being converted, greater frequency variations with time occurring during conversion of increasingly higher frequency portions of said spectrum, selectivity control means for said tunable filter, and means for controlling said selectivity control means so as to provide substantially optimum slectivity of said tuned filter for each instantaneous rate of frequency variation with time.

BEN H. TONGUE.

References Cited in the file of this patent

UNITED STATES PATENTS

| Number | Name | Date |
|---|---|---|
| 1,994,232 | Schuck, Jr. | Mar. 12, 1935 |
| 2,045,300 | Koch | June 23, 1936 |

(Other references on following page)

UNITED STATES PATENTS

| Number | Name | Date |
|---|---|---|
| 2,072,953 | Kelley | Mar. 9, 1937 |
| 2,085,196 | Koch | June 29, 1937 |
| 2,174,566 | Case | Oct. 3, 1939 |
| 2,215,197 | Sherman | Sept. 17, 1940 |
| 2,216,160 | Curtis | Oct. 1, 1940 |
| 2,293,480 | Tovar | Aug. 18, 1942 |
| 2,381,940 | Wallace et al. | Aug. 14, 1945 |
| 2,382,436 | Marble | Aug. 14, 1945 |
| 2,408,858 | Keizer | Oct. 8, 1946 |
| 2,416,346 | Potter | Feb. 25, 1947 |
| 2,432,214 | Sontheimer | Dec. 9, 1947 |
| 2,435,960 | Fyler | Feb. 17, 1948 |
| 2,455,732 | Carter | Dec. 7, 1948 |
| 2,459,846 | Smythe et al. | Jan. 25, 1949 |
| 2,462,849 | Dishal et al. | Mar. 1, 1949 |
| 2,485,620 | McCoppin | Oct. 25, 1949 |
| 2,514,443 | Crosby | July 11, 1950 |
| 2,590,809 | Wallace | Mar. 25, 1952 |

OTHER REFERENCES

Electronic Engineering, September 1948, pages 279–284.

Electronic Engineering, August, 1948, pages 243–247.

Radiotron Designer's Handbook, 1940, Wireless Press, pages 181–182.